US010897534B1

(12) United States Patent
Sui et al.

(10) Patent No.: US 10,897,534 B1
(45) Date of Patent: Jan. 19, 2021

(54) OPTIMIZATION FOR A CALL THAT WAITS IN QUEUE

(71) Applicant: International Business Machines Corporation, Armonk, NY (US)

(72) Inventors: Guang Han Sui, Beijing (CN); Peng Hui Jiang, Beijing (CN); Qin Li, Shanghai (CN); Ping Xiao, Changping (CN); Niao Qing Liu, Beijing (CN); Xiang Zhou, Beijing (CN); Ping Ping Cheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/569,806

(22) Filed: Sep. 13, 2019

(51) Int. Cl.
*H04M 3/428* (2006.01)
*G10L 15/22* (2006.01)
*G10L 21/0316* (2013.01)
*G10L 15/26* (2006.01)
*G10L 21/043* (2013.01)

(52) U.S. Cl.
CPC .......... *H04M 3/4286* (2013.01); *G10L 15/22* (2013.01); *G10L 15/26* (2013.01); *G10L 21/0316* (2013.01); *G10L 21/043* (2013.01); *H04M 2203/2027* (2013.01)

(58) Field of Classification Search
CPC ..... G10L 15/22; G10L 15/265; G10L 21/043; G10L 21/0316; H04M 3/4286; H04M 2203/2027
USPC ..... 370/259–271, 351–357; 379/67.1–88.28, 379/265.01–266.1; 709/201–207, 709/217–248
See application file for complete search history.

(56) References Cited

U.S. PATENT DOCUMENTS

| 8,619,965 | B1 * | 12/2013 | Figa | H04W 4/12 379/215.01 |
| 8,774,387 | B2 | 7/2014 | Di Fabbrizio et al. | |
| 10,148,815 | B2 | 12/2018 | Amir et al. | |

(Continued)

FOREIGN PATENT DOCUMENTS

| CN | 102625005 A | 8/2012 |
| CN | 103701999 A | 4/2014 |

(Continued)

OTHER PUBLICATIONS

Anonymous, *Smartphone Hold Queue Handler*, IP.com Prior Art Database Technical Disclosure No. IPCOM000253939D, May 16, 2018, IP.com (online), URL: priorart.ip.com/IPCOM/000253939.

(Continued)

*Primary Examiner* — Hemant S Patel
(74) *Attorney, Agent, or Firm* — Jason H. Sosa

(57) ABSTRACT

Embodiments of the invention provide methods, systems, computer program products for managing a call waiting in a queue during a request for staff services provided by a call center. According to the method, a first voice segment received in a call made by a device is recorded first. Next, whether a part of the first voice segment is related to a first predefined voice segment is determined. The volume of device is adjusted in response to the part of the first voice segment being related to the first predefined voice segment. A user of the device is alerted in response to the part of the first voice segment being not related to the first predefined voice segment.

20 Claims, 6 Drawing Sheets

(56) References Cited

U.S. PATENT DOCUMENTS

| | | | |
|---|---|---|---|
| 2014/0195501 A1* | 7/2014 | Vlack | G06F 16/683 |
| | | | 707/693 |
| 2018/0090142 A1 | 3/2018 | Li et al. | |
| 2019/0052751 A1 | 2/2019 | Gabbai | |

FOREIGN PATENT DOCUMENTS

| | | |
|---|---|---|
| CN | 105261362 A | 1/2016 |
| WO | 2005020212 A1 | 3/2005 |
| WO | 2014145149 A1 | 9/2014 |

OTHER PUBLICATIONS

International Search Report and Written Opinion, PCT/CN20201092362, dated Aug. 3, 2020, 9 pages.

* cited by examiner

OPTIMIZATION FOR A CALL THAT WAITS IN QUEUE

BACKGROUND

Embodiments of the present invention relate to the field of computer software. More particularly, they relate to methods, systems, and computer program products for managing a call for a call waiting in a queue.

Nowadays call centers are widely used in many industries, for example, the financial industry and other service industries.

SUMMARY

In an aspect, a method for managing a call to a call center that waits in a queue when attempting to receive service from a staff member of the call center is disclosed. According to the method, a first voice segment received in a call made by a device is recorded first. Then, whether a part of the first voice segment is related to a first predefined voice segment is determined. At last, volume of the device is adjusted in response to the part of the first voice segment being related to the first predefined voice segment while a user of the device is alerted in response to the part of the first voice segment being not related to the first predefined voice segment.

In another aspect, a computer-implemented system is disclosed. The system may include a computer processor coupled to a computer-readable memory unit, said memory unit comprising instructions that when executed by the computer processor implements the above method.

In yet another aspect, a computer program product is disclosed. The computer program product comprises a computer readable storage medium having program instructions embodied therewith. When executed on one or more processors, the instructions may cause the one or more processors to perform the above method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
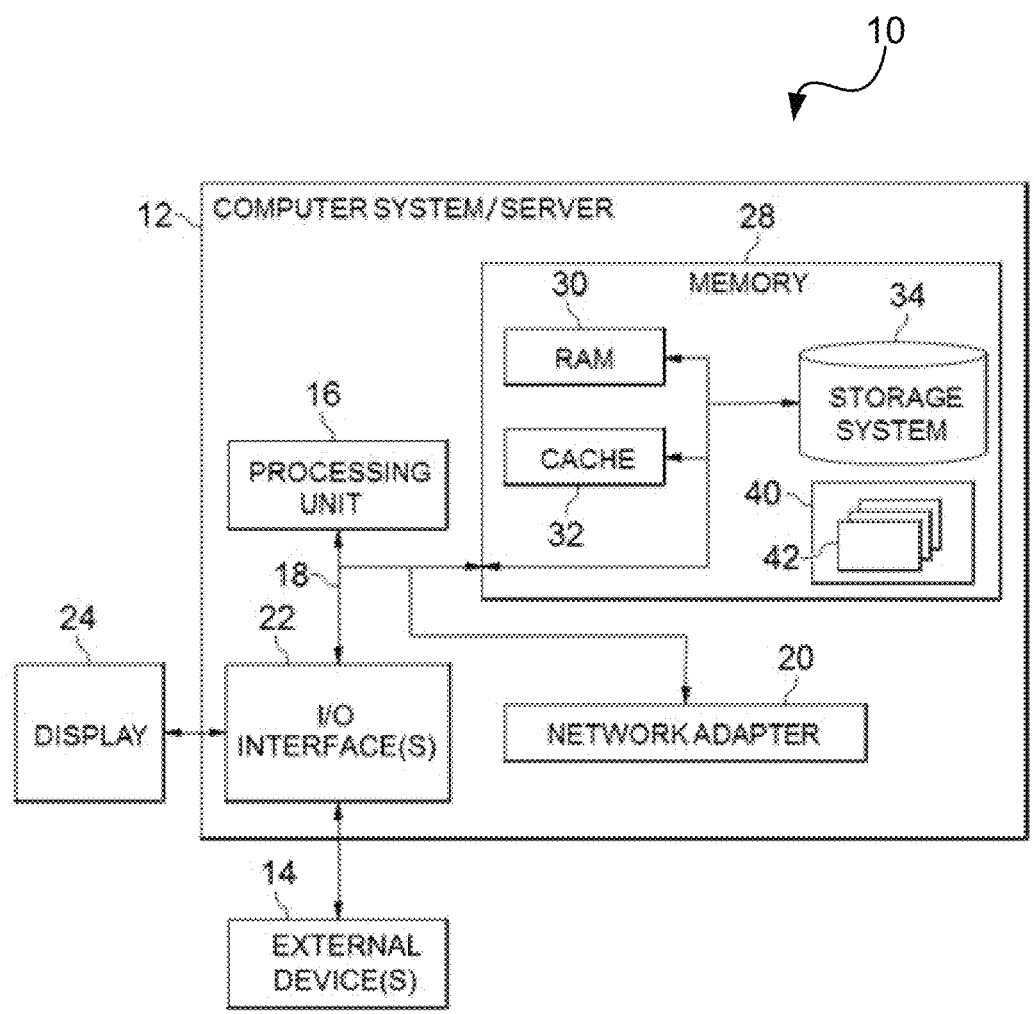
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
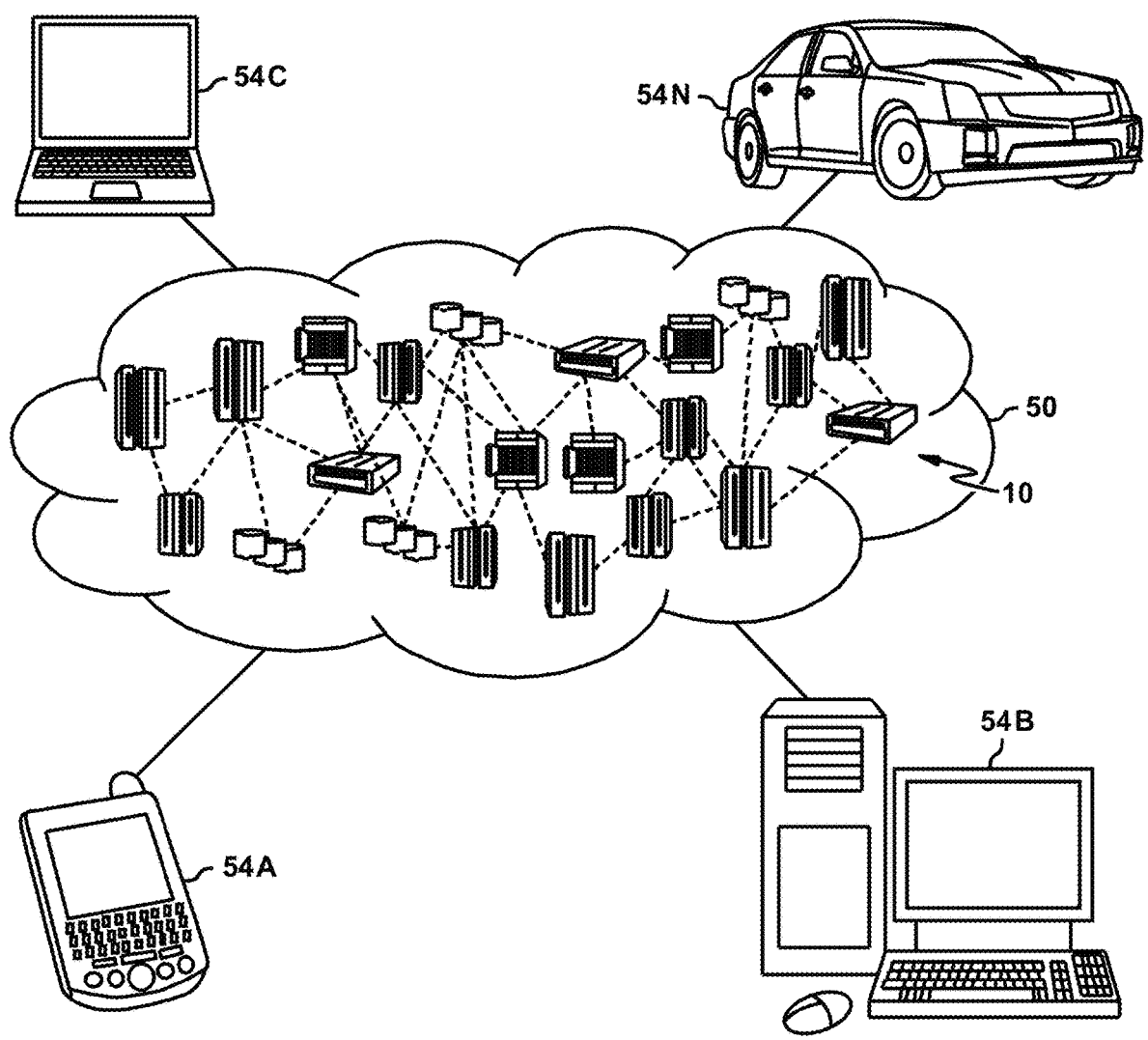
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
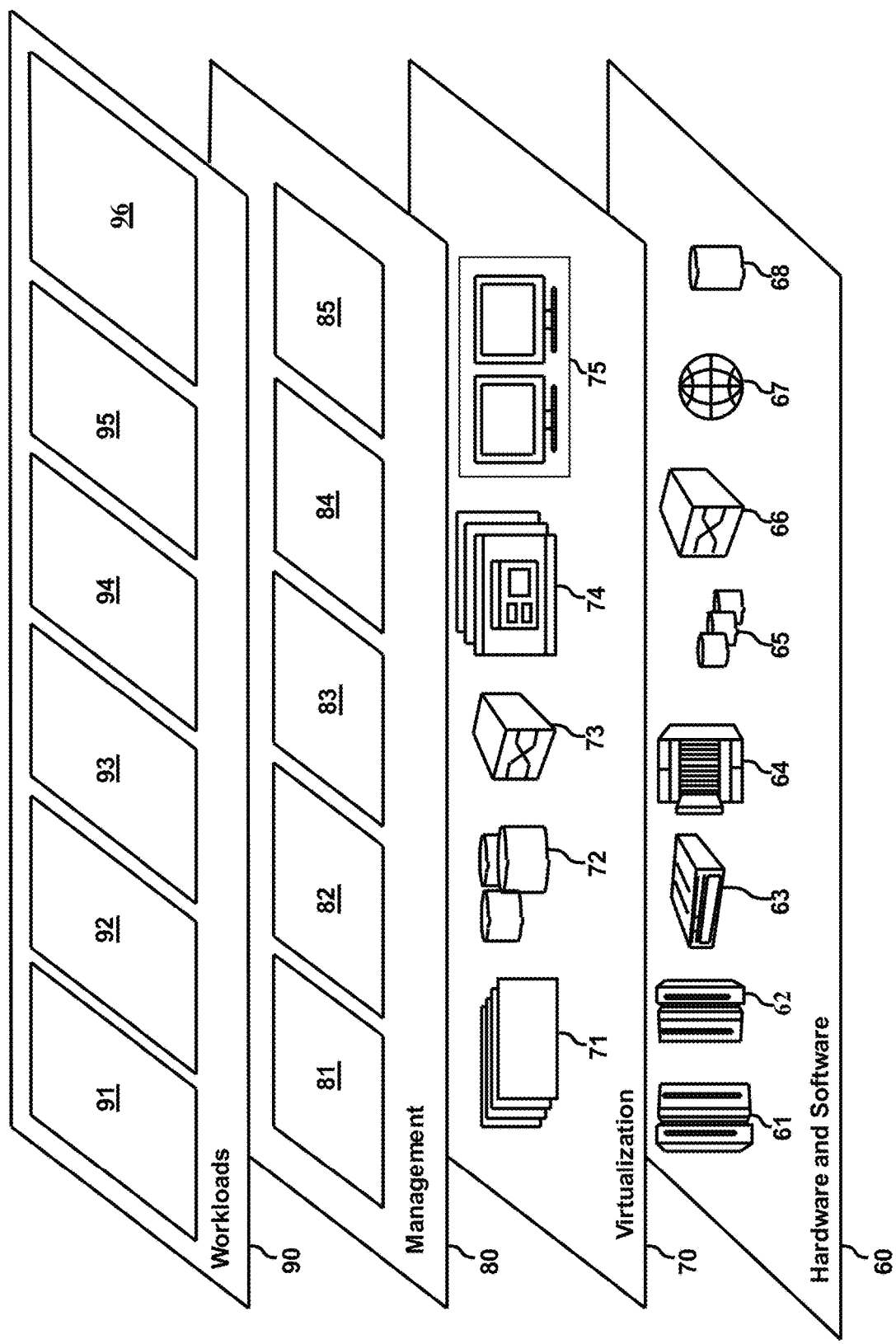
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and call management 96.

With the increase of labor costs, many companies currently prefer to provide less service staff for call centers. This results in many users' calls having to wait in a queue for a long time before the users can speak to a call center staff member to receive assistance or services, hereinafter referred to as staff services. These waiting users have to listen to repeated prompt tones from the call center, such as, "no available service staff, please continue to wait . . . ", until a service staff member is available. This waiting process is very boring for the users, but if the user does not pay attention to the prompt tones, the user may miss the staff services for which they are waiting. As an example, the prompt tones may comprise voices from the available service staff, such as, "Hello, may I help you?".

Under above circumstances, if a user can put down his/her device directly and perform other tasks during the waiting process, and the user can be immediately alerted so that the user can talk to the service staff in time once a service staff member is available, the user's experience will be greatly improved.

Existing technologies for call management in the call centers include robots that try to solve a user's problem using artificial intelligence (AI) technologies. However, there are some problems that still require help from a service staff member. For example, the AI robot may fail to understand the user's problem due to the user's accent, or the AI robot does not offer a solution to a new problem from a user, and the like.

Therefore, there is a need to provide approaches for managing a call for a request for staff service to improve user experiences when the user has to wait for the staff service.

Embodiments of the present invention provided a method for managing a call to request a staff service that improves a user experience. According to the method, when a user calls a call center requesting a staff service and there is no available service staff member, the user can launch a software module implementing the method of the present invention in a device, and then the user can put down the device and perform other tasks. The software module can monitor the call center's response while adjusting the volume of the device so that the user will not be disturbed. Once the software module finds that there is an available service staff member, the software module can alert the user immediately, so that the user can talk to the service staff in time.

Figure 4:
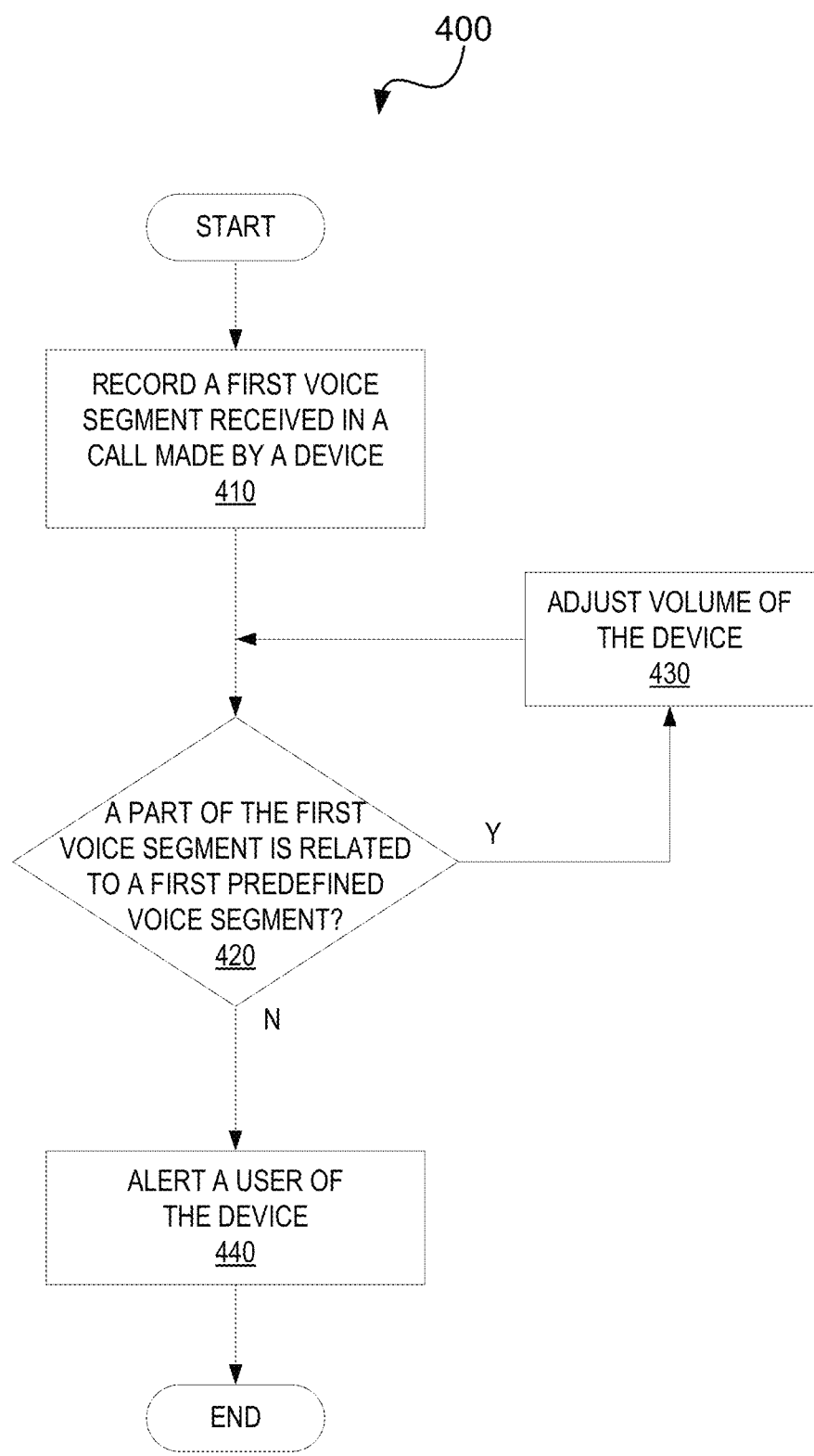
FIG. 4 depicts a schematic flowchart of a method for managing a call for a staff service according to an embodiment of the present invention.

FIG. 4 depicts a schematic flowchart of a method 400 for managing a call to request a staff service according to an embodiment of the present invention. In some embodiments, the method 400 can be implemented with a module comprising two threads, one being a recording thread and the other being a call thread. The method 400 can be started by a user of the device. For example, the operation system of the device can provide a button in a call interface for the user to press to activate the module of the invention, and when the user sets up a call with a call center and his service request enters into a waiting process, the user can press the button to activate the module of the invention so that the module can implement the method of this invention on the device. In some embodiments, the method can be started automatically according to the user's configuration of the module.

Referring to FIG. 4, at step 410, a first voice segment received from the call center during a call made by the device is recorded by the call thread. In some embodiments, the first voice segment can be stored continuously in one voice file. In some embodiments, the first voice segment can be stored continuously in memory. The recording thread may be parallelly executed together with the call thread.

At step 420, it is determined whether a part of the first voice segment is related to a first predefined voice segment in the call thread. The first predefined voice segment can be a repeated voice segment received from the call center, such as a voice segment "no available service staff, please continue to wait . . . ". If a current voice sub-segment (a voice sub-segment selected from the first voice segment) is related to the first predefined voice segment, it can be concluded that there is no available service staff yet. However, if the current voice sub-segment is totally different from the first predefined voice segment, for example, the current voice segment is "service staff member No. 123 is available, good morning, may I help you?", it can be concluded that there is an available service staff.

In some embodiment, the first predefined voice segment may comprise several predefined voice sub-segments. For example, one predefined voice sub-segment may be "no available service staff, please continue to wait . . . ", and another predefined voice sub-segment may be a notification voice segment from the call center. To simplify the description, the first predefined voice segment comprises only one predefined voice segment hereafter.

In some embodiments, the first predefined voice segment can be determined by the user through recording a voice segment that is repeated, referred to as a repeated voice segment hereafter, from the call center. For example, the module of the invention can provide an option for the user of the device to record the repeated voice segment as the first predefined voice segment. The user may press a "start recording" button before the repeated voice segment, corresponding to a piece of text generated by a speech-to-text feature, "no available service staff, please continue to wait . . . " is received, and after the repeated voice segment is recorded, the user may press a "end recording" button. Then the repeated voice segment can be stored as the first predefined voice segment. In some embodiments, the first predefined voice segment can be obtained from a third party, for example, it can be downloaded from a website of a call center. In some embodiments, the first predefined voice segment may be selected by a user from existing voice segments.

In some embodiment, the first predefined voice segment can be determined automatically. For example, the module may record a second voice segment received on the call via the device for a predefined time period, such as 20 seconds. Then the module may identify the repeated voice segment from the second voice segment.

In some embodiments, the pitch of the second voice segment may be used to identify the repeated voice segment, then the identified repeated voice segment can be used as the first predefined voice segment. Specifically, the second voice segment may be split into a plurality of voice sub-segments using a sliding window (there may be overlap between two voice sub-segments). For example, suppose that the sliding window corresponds to a voice segment with a width of 5 seconds and a sliding length corresponds to a voice segment with a length of 1 second (the parameter can be defined to be other values as needed, the width of the window and the sliding length can also be defined by the user as needed), then a first voice sub-segment corresponds to the second voice segment from the start to a point corresponding to 5 seconds (start); a second voice sub-segment corresponds to the second voice segment from a point corresponding to 1 seconds (start) to a point corresponding to 6 seconds (start), and third voice sub-segment corresponds to the second voice segment from a point corresponding to 2 seconds (start) to a point corresponding to 7 seconds (start), etc. Next, a plurality of sets of pitches of the above plurality of voice sub-segments can be determined. Then a repeated set of pitches can be identified from the plurality of sets of pitches, and a voice sub-segment of the plurality of voice sub-segments corresponding to the repeated set of pitches can be identified as the first predefined voice segment (e.g. difference of two sets of pitches is within a predefined threshold). For example, consider that there are four voice sub-segments in the second voice segment and four sets of pitches are {A, A, B, C}, {A+0.05A, B+0.06B, C+0.08C, D}, {A+0.01A, A+0.02A, B+0.04B, C+0.03C}, {B+0.09B, C+0.09C, D+0.02D, E} respectively, then {A, A, B, C} can be identified as the repeated set of pitches. A voice sub-segment corresponding to the repeated set of pitches {A, A, B, C} can be identified as the first predefined voice segment. Those skilled in the art may understand that the above four sets of pitches are just for exemplary purpose, the values of the set of pitches can be determined by those skilled in the art using existing technologies.

In some embodiments, Mel Frequency Cepstral Coefficients (MFCCs) can replace the above pitches to identify the repeated voice segment in the second voice segment. Specifically, each set of MFCCs of each of the above plurality of voice sub-segments, which can be known by those skilled in the art, can be determined first. Next, a set of MFCCs that is repeated can be identified from the plurality of sets of MFCCs (e.g. difference of two sets of MFCCs is within a predefined threshold). Then a voice sub-segment of the plurality of voice sub-segments corresponding to the repeated set of MFCCs can be identified as the first predefined voice segment. The determination of MFCCs for a voice segment is well known by those skilled in the art and is omitted here.

In some embodiments, the second voice segment may be transformed into a first piece of text, and then a second piece of text that is repeated in the first piece of text (referred to a "piece of text repeated" hereafter) can be identified using text recognition technologies. For example, two same words in the first piece of text are searched first, then respective next words to the same words in the first piece of text are compared and the process is repeated until the piece of text repeated is found. Then a voice sub-segment of the plurality of voice sub-segments corresponding to the piece of text repeated in the second voice segment can be obtained as the first predefined voice segment.

In some embodiments, the above plurality of voice sub-segments can be converted into a plurality of pieces of text. Then the piece of text repeated can be identified from the plurality of pieces of text. For example, if two pieces of texts are substantially related (for example, 80% words are same), then one of the two pieces of texts is identified as the piece of text repeated. Afterwards, a voice sub-segment of the plurality of voice sub-segments corresponding to the piece of text repeated can be determined to be the first predefined voice segment.

Those skilled in the art may understand that other voice features can also be used to identify the repeated voice segment in the second voice segment. And some general voice processing steps, such as filtering, etc., are omitted here since they are well known to those skilled in the art. In general, the manner using speech-to-text conversion is better than others in accuracy, availability and resource utilization efficiency.

Figure 5:
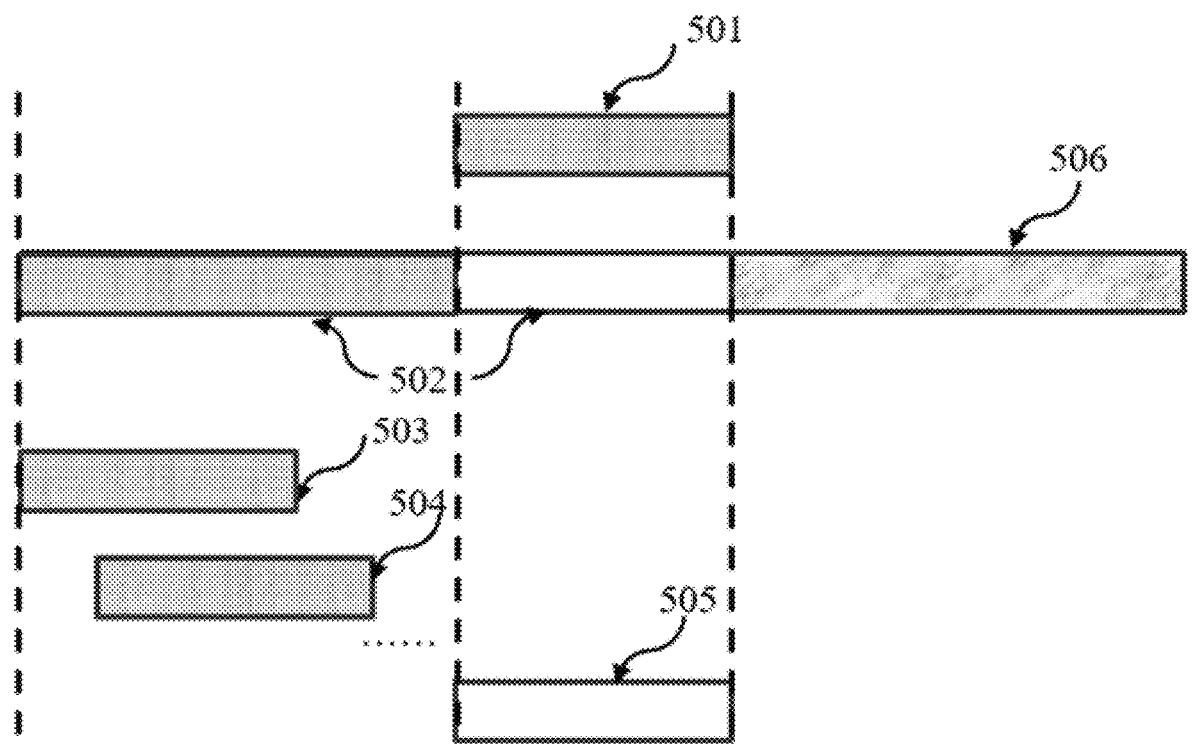
FIG. 5 shows an exemplary diagram for comparing a part of the first voice segment with a first predefined voice segment continuously according to an embodiment of the present invention.

In some embodiments, when the first voice segment is stored in one voice file, a sliding window similar to the sliding window used to identify the repeated voice segment can be used to get the part of the first voice segment. FIG. 5 shows an exemplary diagram for comparing the part of the first voice segment with the first predefined voice segment continually according to an embodiment of the present invention. The first predefined voice segment 501 has a width of 5 seconds, the same width with the sliding window. Each time, the sliding window is slid a length of a voice segment corresponding to such as 1 second along the first voice segment to get a next voice sub-segment in the sliding window as the part of the first voice segment. The smaller the sliding length, the better the comparation results. As shown in FIG. 5, the first voice segment 502 is split into a plurality of voice sub-segments (with overlap between a current voice sub-segment and a next voice sub-segment), where a first voice sub-segment 503 corresponds to the first voice segment from the start to a point corresponding to 5 seconds(start); the second voice 504 sub-segment corresponds to the first voice segment from a point corresponding to 1 seconds(start) to a point corresponding to 6 seconds (start), etc. Here each voice sub-segment of the first voice segment (e.g. the part of the first voice segment), such as 503, 504, etc., can be compared with the first predefined voice segment 501 to determine whether both are related. If both are related, a next voice sub-segment obtained by using the sliding window in the first voice segment can be compared with the first predefined voice segment 501, and the comparation process is repeated until a voice sub-segment 505, which is not related to the first predefined voice segment 501, is found.

Whether a part of the first voice segment is related to a first predefined voice segment can be determined based on respective set of pitches, a set of MFCC, or texts of two voice sub-segments. In some embodiments, the part of the first voice segment is converted into a first piece of text, the first predefined voice segment is converted into a second piece of text, and whether the first piece of text is related to the second piece of text can be determined by comparing them. Then whether the part of the first voice segment is related to the first predefined voice segment can be determined based on the comparison between the first piece of text and the second piece of text. In an example, if the first piece of text is related to the second piece of text, the part of the first voice segment and the first predefined voice segment can be determined to be related. In another example, if differences between the first piece of text and the second piece of text is under a preset threshold, the part of the first voice segment and the first predefined voice segment can be determined to be related.

In some embodiments, a set of pitches of the part of the first voice segment is determined first, and then a set of pitches of the first predefined voice segment is determined. Next, the set of pitches of the part of the first voice segment and the set of pitches of the first predefined voice segment are compared to determine whether the set of pitches of the part of the first voice segment is related to the set of pitches of the first predefined voice segment. Accordingly, whether the part of the first voice segment is related to the first predefined voice segment can be determined based on a comparison between the set of pitches of the part of the first voice segment and the set of pitches of the first predefined voice segment. In an example, if the set of pitches of the part of the first voice segment is related to the set of pitches of the first predefined voice segment, the part of the first voice segment and the first predefined voice segment can be determined to be related. In another example, if differences between the set of pitches of the part of the first voice segment and the set of pitches of the first predefined voice segment is under a preset threshold, the part of the first voice segment and the first predefined voice segment can be determined to be related.

In some embodiments, a set of MFCCs of the part of the first voice segment is determined first, and then a set of MFCCs of the first predefined voice segment is determined. Next, the set of MFCCs of the part of the first voice segment and the set of MFCCs of the first predefined voice segment are compared to determine whether the set of MFCCs of the part of the received voice is related to the set of MFCCs of the first predefined voice segment. Accordingly, whether the part of the first voice segment is related to the first predefined voice segment can be determined based on a comparison between the set of MFCCs of the part of the first voice segment and the set of MFCCs of the first predefined voice segment. In an example, if the set of MFCCs of the part of the first voice segment is related to the set of MFCCs of the first predefined voice segment, the part of the first voice segment and the first predefined voice segment can be determined to be related. In another example, if differences between the set of MFCCs of the part of the first voice segment and the set of MFCCs of the first predefined voice segment is under a preset threshold, the part of the first voice segment and the first predefined voice segment can be determined to be related.

In some embodiments, whether the part of the first voice segment is related to the first predefined voice segment can be determined based on a correlation between the part of the first voice segment and the first predefined voice segment. The correlation between the part of the first voice segment and the first predefined voice segment can be represented as a correlation between a piece of text of the part of the first voice segment, obtained through speech-to-text, and a piece of text of the first predefined voice segment, obtained through speech-to-text, or a correlation between the set of pitches of the part of the first voice segment and the set of pitches of the first predefined voice segment, or a correlation between the set of MFCCs of the part of the first voice segment and the set of MFCCs of the first predefined voice segment, etc. Further, various correlation can be defined. In some embodiments, if the correlation between the part of the first voice segment and the first predefined voice segment is greater than a preset threshold, the part of the first voice segment and the first predefined voice segment can be determined to be related. For example, the correlation can be defined as number of same words contained in two pieces of text corresponding to these two voice sub-segments. In some embodiments, if the correlation between the part of the first voice segment and the first predefined voice segment is less than a preset threshold, the part of the first voice segment and the first predefined voice segment can be determined to be related. For example, the correlation can be defined as an accumulated difference between the two sets of pitches of two voice sub-segments.

Referring back to FIG. 4, at step 430, a volume of the device is adjusted, such as by reducing the volume and even muting the call in the call thread in response to the part of the first voice segment being related to the first predefined voice segment. As shown in FIG. 5, each of two voice sub-segments 503 and 504 is related to the first predefined voice segment 501, it can be determined that the call center is sending the repeated voice segment during a corresponding period, in other words, there is no available service staff during the period. Thus, volume of the device is adjusted in order that the user is not disturbed.

At step 440, the user of the device is alerted in the call thread in response to the part of the first voice segment being not related to the first predefined voice segment. As shown in FIG. 5, when the voice sub-segment 505 and the first predefined voice segment 501 are determined to be not related, it can be determined that the call center is sending a difference voice sub-segment during that period, in other words, there is an available service staff member for the service call now. The user can be alerted using any existing ways, such as voice alerts, device vibration, light signals from the device, information displayed on the screen of the device, and rings of the device, etc. The method 400 is then ended. Since there is an available service staff member at this time, the user can talk to the service staff directly. As shown in FIG. 5, at the end of the part of the first voice segment 505, the user is alerted. Before that time, volume of the device is adjusted so that the user will not be disturbed.

It can be found from FIG. 5 that the user may miss the voice sub-segment 505 which is the likely being said by the available service staff member when the staff member becomes available. To that end, embodiments of the present invention may include repeating the voice sub-segment 505 for the user.

Figure 6:
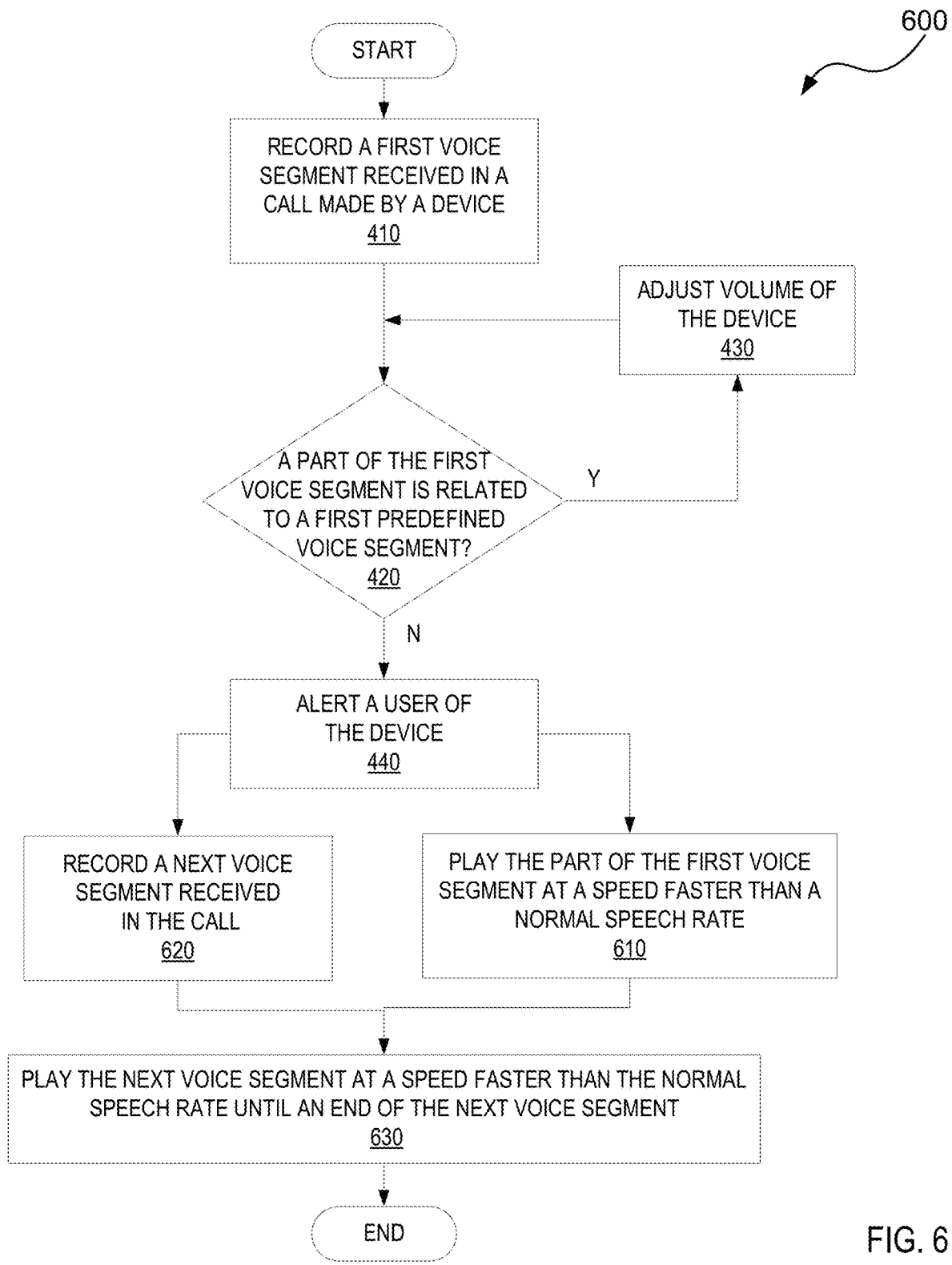
FIG. 6 depicts a schematic flowchart of a method contained in the method in FIG. 4 for improving user's experience according to an embodiment of the present invention.

FIG. 6 depicts a schematic flowchart of a method 600 for improving a user experience during a call waiting in a queue according to an embodiment of the present invention. Like the method 400 of FIG. 4, the method of FIG. 6 also includes recording 410 a first voice segment received from the call center during a call made by the device in the call thread, determining 420 whether a part of the first voice segment is related to a first predefined voice segment in the call thread, adjusting 430 a volume of the device, alerting 440 the user in the call thread in response to the part of the first voice segment being not related to the first predefined voice segment. In the method of FIG. 6, in response to the part of the first voice segment being not related to the first predefined voice segment, at step 610, the part of the first voice segment (such as the voice sub-segment 505 in FIG. 5) is played in the call thread at a speed faster than a normal speech rate. For example, the speed can be double normal speech rate or any other speech rate faster than the normal speech rate. At step 620, a next voice segment received in the call (such as a voice segment 506 in FIG. 5) is recorded in the recording thread. Both steps 610 and 620 can be parallelly executed in different threads. After the part of the first voice segment (505) is played, at step 630, the next voice segment (506) is played in the call thread at a speed faster than normal speech rate until an end of the next voice segment. Here the end means that both the playing process for the next voice segment and the recording process for the next voice segment reach the same time point of the next voice segment. Then the user can talk to the service staff directly. It can be found that steps 610 and 620 can be executed at the substantially similar time in different threads, and steps 610 and 440 can be executed in any order, e.g. steps 610 can be followed by step 440 or steps 440 can be followed by step 610.

In some embodiments, the method 400 further comprise a step, before the end of method 400, of calling the other side (e.g. the call center) of the call using a second predefined voice segment in response to the part of the first voice segment being not related to the first predefined voice segment. In an example, the second predefined voice segment can be, such as a voice segment "The caller is in the waiting process and will take over the call as soon as possible. Please wait a moment.", so that the available service staff member can know the current situation and can wait for a moment to continue the call. After alerting the caller, the call thread implementing most of method 400 may send the above second predefined voice segment to alert the available service staff, such that when the user picks up the device and speaks, the available service staff can repeat the repeated voice segment such as 505 to improve user experience. Those skilled in the art may understand this step can be combined with method of FIG. 6. The playing speed is faster than the recording speed, so both the playing process and the recording process can be eventually ended at the same time. The user is listening to the missed voice sub-segment and the next voice segment, meanwhile the available service staff is listening to the second predefined voice segment and then may wait for the user. Then the user and the service staff can speak directly at the end of method 400 of FIG. 4 or the method 600 of FIG. 6.

It should be noted that the processing of managing a call for a staff service according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   recording, by one or more processors, a first voice segment received by a user of a device during a call;
   determining, by one or more processors, whether a part of the first voice segment is related to a first predefined voice segment;
   adjusting, by one or more processors, volume of the device in response to the part of the first voice segment being related to the first predefined voice segment, wherein adjusting the volume of the device includes reducing the volume of the device; and
   alerting, by one or more processors, the user of the device in response to the part of the first voice segment being not related to the first predefined voice segment.

2. The method of claim 1, further comprising:
   in response to the part of the first voice segment being not related to the first predefined voice segment:
   playing, by one or more processors, the part of the first voice segment at a speed faster than a normal speech rate;
   recording, by one or more processors, a next voice segment received in the call; and
   playing, by one or more processors, the next voice segment at a speed faster than the normal speech rate in response to an end of the playing of the part of the first voice segment until an end of the next voice segment.

3. The method of claim 1, further comprising:
   sending, by one or more processors, a second predefined voice segment to the other side of the call in response to the part of the first voice segment being not related to the first predefined voice segment; and wherein the first predefined voice segment is a repeated voice segment in the call.

4. The method of claim 1, wherein the determining whether the part of the first voice segment is related to the first predefined voice segment comprises:

converting, by one or more processors, the part of the first voice segment into a first piece of text;

converting, by one or more processors, the first predefined voice segment into a second piece of text; and determining, by one or more processors, whether the part of the first voice segment is related to the first predefined voice segment based on a comparison between the first piece of text and the second piece of text.

5. The method of claim 1, wherein the determining whether the part of the first voice segment is related to the first predefined voice segment comprises:

determining, by one or more processors, a set of pitches of the part of the first voice segment;

determining, by one or more processors, a set of pitches of the first predefined voice segment; and determining, by one or more processors, whether the part of the first voice segment is related to the first predefined voice segment based on a comparison between the set of pitches of the part of the first voice segment and the set of pitches of the first predefined voice segment.

6. The method of claim 1, wherein the determining whether the part of the first voice segment is related to the first predefined voice segment comprises:

determining, by one or more processors, a set of Mel Frequency Cepstral Coefficients (MFCCs) of the part of the first voice segment;

determining, by one or more processors, a set of MFCCs of the first predefined voice segment; and determining, by one or more processors, whether the part of the first voice segment is related to the first predefined voice segment based on a comparison between the set of MFCCs of the part of the first voice segment and the set of MFCCs of the first predefined voice segment.

7. The method of claim 1, wherein the first predefined voice segment is obtained by:

recording, by one or more processors, a second voice segment received in the call for a predefined time period;

converting, by one or more processors, the second voice segment into a third piece of text;

identifying, by one or more processors, a piece of text repeated in the third piece of text; and obtaining, by one or more processors, a part of the second voice segment corresponding to the piece of text repeated as the first predefined voice segment.

8. The method of claim 1, wherein the first predefined voice segment is obtained by:

recording, by one or more processors, a second voice segment received in the call for a predefined time period;

splitting, by one or more processors, the second voice segment into a plurality of voice sub-segments using a sliding window;

converting, by one or more processors, the plurality of voice sub-segments into a plurality of pieces of text;

identifying, by one or more processors, a piece of text repeated from the plurality of pieces of text; and identifying, by one or more processors, a voice sub-segment of the plurality of voice sub-segments corresponding to the piece of text repeated as the first predefined voice segment.

9. The method of claim 1, wherein the first predefined voice segment is obtained by:

recording, by one or more processors, a second voice segment received by the call for a predefined time period;

splitting, by one or more processors, the second voice segment into a plurality of voice sub-segments using a sliding window;

determining, by one or more processors, a plurality of sets of pitches of the plurality of voice sub-segments;

identifying, by one or more processors, a set of pitches repeated from the plurality of pieces of pitches; and identifying, by one or more processors, a voice sub-segment of the plurality of voice sub-segments corresponding to the set of pitches repeated as the first predefined voice segment.

10. The method of claim 1, wherein the first predefined voice segment is obtained by:

recording, by one or more processors, a second voice segment received on the call for a predefined time period;

splitting, by one or more processors, the second voice segment into a plurality of voice sub-segments using a sliding window;

determining, by one or more processors, a plurality of sets of Mel Frequency Cepstral Coefficients (MFCCs) of the plurality of voice sub-segments;

identifying, by one or more processors, a set of MFCCs repeated from the plurality of sets of MFCCs; and identifying, by one or more processors, a voice sub-segment of the plurality of voice sub-segments corresponding to the set of MFCCs repeated as the first predefined voice segment.

11. The method of claim 1, wherein the alerting the user of the device comprises alerting the user of the device using at least one of the followings:

voice alerts, device vibration, light signals from the device, information displayed on the screen of the device, and rings of the device.

12. A system, comprising:

one or more processors;

a memory coupled to at least one of the processors; and a set of computer program instructions stored in the memory and executed by at least one of the processors in order to perform actions of:

recording a first voice segment received by a user of a device during a call;

determining whether a part of the first voice segment is related to a first predefined voice segment;

adjusting volume of the device in response to the part of the first voice segment being related to the first predefined voice segment, wherein adjusting the volume of the device includes reducing the volume of the device; and alerting the user of the device in response to the part of the first voice segment being not related to the first predefined voice segment.

13. The system of claim 12, the actions further comprising:

in response to the part of the first voice segment being not related to the first predefined voice segment:

playing the part of the first voice segment at a speed faster than a normal speech rate;

recording a next voice segment received in the call; and playing the next voice segment at a speed faster than the normal speech rate in response to an end of the playing of the part of the first voice segment until an end of the next voice segment.

14. The system of claim 12, the actions further comprising:

sending a second predefined voice segment to the other side of the call in response to the part of the first voice segment being not related to the first predefined voice segment; and wherein the first predefined voice segment is a repeated voice segment in the call.

15. The system of claim 12, wherein the determining whether the part of the first voice segment is related to the first predefined voice segment comprises:

converting the part of the first voice segment into a first piece of text;

converting the first predefined voice segment into a second piece of text; and determining whether the part of the first voice segment is related to the first predefined voice segment based on a comparison between the first piece of text and the second piece of text.

16. The system of claim 12, wherein the first predefined voice segment is obtained by:

recording a second voice segment received in the call for a predefined time period;

converting the second voice segment into a third piece of text;

identifying a piece of text repeated in the third piece of text; and obtaining a part of the second voice segment corresponding to the piece of text repeated as the first predefined voice segment.

17. The system of claim 12, wherein the first predefined voice segment is obtained by:

recording a second voice segment received on the call for a predefined time period;

splitting the second voice segment into a plurality of voice sub-segments using a sliding window;

converting the plurality of voice sub-segments into a plurality of pieces of text;

identifying a piece of text repeated from the plurality of pieces of text; and identifying a voice sub-segment of the plurality of voice sub-segments corresponding to the piece of text repeated as the first predefined voice segment.

18. The system of claim 12, wherein the alerting the user of the device comprises alerting the user of the device using at least one of the followings:

voice alerts, device vibration, light signals from the device, information displayed on the screen of the device, and rings of the device.

19. A computer program product, comprising a computer readable storage medium having program instructions stored thereon, the program instructions executable by a processor to cause the processor to:

record a first voice segment received by a user of a device during a call;

determine whether a part of the first voice segment is related to a first predefined voice segment;

adjust volume of the device in response to the part of the first voice segment being related to the first predefined voice segment, wherein adjusting the volume of the device includes reducing the volume of the device; and alert the user of the device in response to the part of the first voice segment being not related to the first predefined voice segment.

20. The computer program product of claim 19, the program instructions executable by a processor to further cause the processor to:

in response to the part of the first voice segment being not related to the first predefined voice segment:

play the part of the first voice segment at a speed faster than a normal speech rate;

record a next voice segment received in the call; and play the next voice segment at a speed faster than the normal speech rate in response to an end of the playing of the part of the first voice segment until an end of the next voice segment.

* * * * *